United States Patent
Takagi et al.

(10) Patent No.: US 8,724,063 B2
(45) Date of Patent: May 13, 2014

(54) LIQUID CRYSTAL OPTICAL APPARATUS, DRIVE DEVICE, AND IMAGE DISPLAY DEVICE

(75) Inventors: Ayako Takagi, Kanagawa-ken (JP); Shinichi Uehara, Tokyo (JP); Masako Kashiwagi, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 90 days.

(21) Appl. No.: 13/598,094

(22) Filed: Aug. 29, 2012

(65) Prior Publication Data

US 2013/0222752 A1 Aug. 29, 2013

(30) Foreign Application Priority Data

Feb. 29, 2012 (JP) ................................. 2012-044686

(51) Int. Cl.
*G02F 1/1343* (2006.01)
(52) U.S. Cl.
USPC .......................................... 349/139; 349/144
(58) Field of Classification Search
USPC ............................ 349/15, 139, 144, 200, 202
See application file for complete search history.

(56) References Cited

U.S. PATENT DOCUMENTS

| 7,423,796 | B2 | 9/2008 | Woodgate et al. |
| 8,300,206 | B2 * | 10/2012 | Kim et al. ..................... 349/202 |
| 8,305,551 | B2 * | 11/2012 | Son ............................... 349/200 |
| 2012/0162592 | A1 | 6/2012 | Takagi et al. |

FOREIGN PATENT DOCUMENTS

JP          2011-186431          9/2011

* cited by examiner

*Primary Examiner* — Edward Glick
*Assistant Examiner* — David Chung
(74) *Attorney, Agent, or Firm* — Finnegan, Henderson, Farabow, Garrett & Dunner, L.L.P.

(57) ABSTRACT

According to one embodiment, a liquid crystal optical apparatus includes first and second substrate units, a liquid crystal layer, and a drive unit. The first substrate unit includes a first substrate having a first major surface, a plurality of first and second electrodes. The first electrodes are provided on the first major surface to extend in a first direction. The second electrodes are provided on the first major surface to extend in the first direction. The second substrate unit includes a second substrate having a second major surface opposing the first major surface and an opposing electrode. The opposing electrode is provided on the second major surface. The liquid crystal layer is provided between the first and second substrate units. The drive unit is electrically connected to the first and second electrodes, and the opposing electrode and forms a refractive index distribution in the liquid crystal layer.

20 Claims, 8 Drawing Sheets

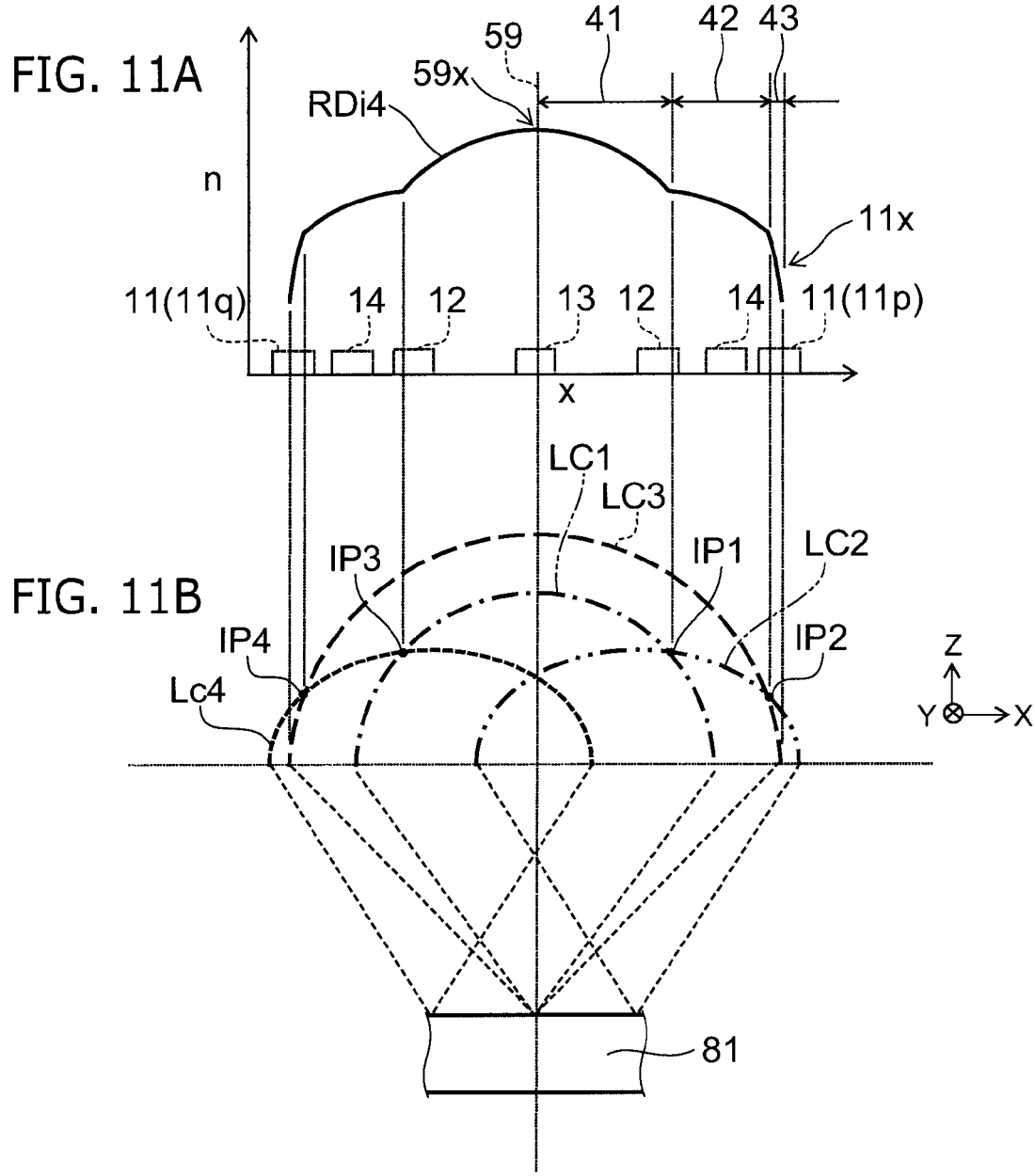

ial display device. Such a stereoscopic image display device switches between a state in which an image displayed on the image display unit is caused to be incident as-is on the eye of a human viewer, and a state in which the image displayed on the image display unit is caused to be incident on the eye of the human viewer as multiple parallax images by changing the distribution of the refractive index of the liquid crystal optical apparatus. Thereby, a two-dimensional display operation and a three-dimensional image display operation are realized. Also, technology is known that modifies the path of the light by utilizing the optical principle of a Fresnel zone plate. High display quality is desirable for such display devices.

LIQUID CRYSTAL OPTICAL APPARATUS, DRIVE DEVICE, AND IMAGE DISPLAY DEVICE

CROSS-REFERENCE TO RELATED APPLICATIONS

This application is based upon and claims the benefit of priority from the prior Japanese Patent Application No. 2012-044686, filed on Feb. 29, 2012; the entire contents of which are incorporated herein by reference.

FIELD

Embodiments described herein relate generally to a liquid crystal optical apparatus, a drive device, and an image display device.

BACKGROUND

A liquid crystal optical apparatus is known that utilizes the birefringence of liquid crystal molecules to change the distribution of the refractive index according to the application of a voltage. There is a stereoscopic image display device that combines such a liquid crystal optical apparatus with an image display unit.

BRIEF DESCRIPTION OF THE DRAWINGS

FIG. 11A and FIG. 11B are schematic views illustrating another configuration of the liquid crystal optical apparatus according to the embodiment.

DETAILED DESCRIPTION

Figure 1:
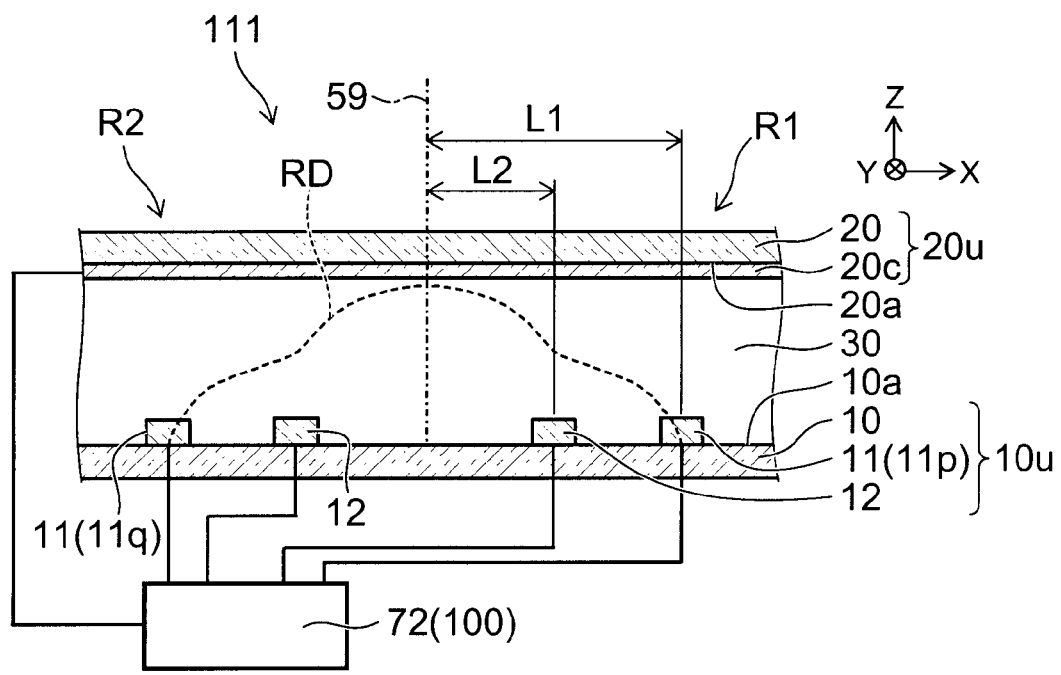
FIG. 1 is a schematic view illustrating the configuration of a liquid crystal optical apparatus according to an embodiment.

According to one embodiment, a liquid crystal optical apparatus includes a first substrate unit, a second substrate unit, a liquid crystal layer, and a drive unit. The first substrate unit includes a first substrate having a first major surface, a plurality of first electrodes, and a plurality of second electrodes. The first electrodes are provided on the first major surface. The first electrodes extend in a first direction and are arranged in a direction non-parallel to the first direction. The second electrodes are provided on the first major surface to extend in the first direction. One of the second electrodes is disposed between a central axis and one of the two most proximal first electrodes. One other of the second electrodes is disposed between the central axis and the other of the two most proximal first electrodes. The central axis is parallel to the first direction to pass through a midpoint of a line segment connecting centers of the two most proximal first electrodes in a second direction parallel to the first major surface and perpendicular to the first direction. The second substrate unit includes a second substrate and an opposing electrode. The second substrate has a second major surface opposing the first major surface. The opposing electrode is provided on the second major surface to oppose the first electrodes and the second electrodes. The liquid crystal layer is provided between the first substrate unit and the second substrate unit. The drive unit is electrically connected to the first electrodes, the second electrodes, and the opposing electrode and configured to form a refractive index distribution in the liquid crystal layer by controlling potential differences among the opposing electrode, the first electrodes, and the second electrodes. The refractive index distribution has an end portion, a central portion, a first portion, a second portion, a third portion and a fourth portion. The end portion is located on the center of the one of the two most proximal first electrodes in the second direction. The central portion is located on the central axis. The first portion is located between the end portion and the central portion. The second portion is located between the first portion and the central portion. The third portion is located between the second portion and the central portion. The fourth portion is located between the third portion and the central portion. A refractive index in the refractive index distribution increases monotonously from the end portion toward the central portion. A first increase rate of the refractive index of the first portion is higher than a second increase rate of the refractive index of the second portion. The second increase rate is lower than a third increase rate of the refractive index of the third portion. The third increase rate is higher than a fourth increase rate of the refractive index of the fourth portion.

Various embodiments will be described hereinafter with reference to the accompanying drawings.

The drawings are schematic or conceptual; and the relationships between the thicknesses and the widths of portions, the proportions of the sizes between portions, etc., are not necessarily the same as the actual values thereof. The dimensions and/or the proportions may be illustrated differently between the drawings, even for identical portions.

In the specification and the drawings of the application, components similar to those described in regard to a drawing

First Embodiment

FIG. 1 is a schematic view illustrating the configuration of a liquid crystal optical apparatus according to an embodiment.

As shown in FIG. 1, the liquid crystal optical apparatus 111 according to the embodiment includes a first substrate unit 10u, a second substrate unit 20u, a liquid crystal layer 30, and a drive unit 72.

The cross section of the configuration of a portion of the liquid crystal optical apparatus 111 is schematically illustrated in FIG. 1.

The first substrate unit 10u includes a first substrate 10, multiple first electrodes 11, and multiple second electrodes 12. The first substrate 10 has a first major surface 10a. The multiple first electrodes 11 and the multiple second electrodes 12 are provided on the first major surface 10a. Each of the multiple first electrodes 11 extends in a first direction. The multiple first electrodes 11 are arranged along a direction non-parallel to the first direction. A direction parallel to the first major surface 10a and perpendicular to the first direction is a second direction. For example, the multiple first electrodes 11 are arranged along the second direction. Two of the multiple first electrodes 11 are illustrated in FIG. 1. The number of the multiple first electrodes 11 is arbitrary.

Herein, the first direction is a Y-axis direction. The second direction is an X-axis direction. A third direction perpendicular to the X-axis direction and the Y-axis direction is a Z-axis direction.

A central axis 59 is between the most proximal first electrodes 11. The central axis 59 passes through a midpoint connecting the X-axis direction centers of the two most proximal first electrodes 11. The central axis 59 is parallel to the Y-axis direction.

The region of the first major surface 10a between the central axis 59 and an electrode 11p which is one of the two most proximal first electrodes 11 is a first region R1. The region of the first major surface 10a between the central axis 59 and an electrode 11q which is the other of the two most proximal first electrodes 11 is a second region R2. The direction from the central axis 59 toward the electrode 11p is the +X direction. The direction from the central axis 59 toward the electrode 11q corresponds to the −X direction.

The multiple second electrodes 12 are provided respectively in the regions between the central axis 59 and the two most proximal first electrodes 11. In other words, two of the multiple second electrodes 12 are provided between the two most proximal first electrodes 11. Each of the multiple second electrodes 12 extends in the Y-axis direction. For example, the one second electrode 12 existing in the first region R1 and the one second electrode 12 existing in the second region R2 are disposed with substantially line symmetry with the central axis 59 as an axis of symmetry. However, this may not be a rigorous line symmetry. For example, a micro asymmetry may be introduced based on the distribution of the arrangement of the liquid crystal layer 30 (e.g., the pretilt angle, etc.).

Thus, one of the multiple second electrodes 12 is disposed between the central axis 59 and one of the two most proximal first electrodes 11 (the electrode 11p), where the central axis 59 is parallel to the first direction to pass through a midpoint of a line segment that connects the second-direction centers of the two most proximal first electrodes 11. One other second electrode 12 of the multiple second electrodes 12 is disposed between the central axis 59 and the other of the two most proximal first electrodes 11 (the electrode 11q).

A distance L1 is the distance from the X-axis direction center position of the first electrode 11 to the central axis 59. A distance L2 is the distance from the X-axis direction center position of the second electrode 12 to the central axis 59. In such a case, for example, the distance L2 is not less than 40% and not more than 60% of the distance L1.

For example, the disposition pitch of the first electrodes 11 (the distance between the X-axis direction centers of the most proximal first electrodes 11) is not less than 10 micrometers (μm) and not more than 1000 μm. Accordingly, for example, the distance L1 is not less than 5 μm and not more than 500 μm. The disposition pitch is set to match the desired specification (the characteristic of the gradient index lens described below). For example, the distance L2 is not less than 2 μm and not more than 300 μm. For example, the lengths (the widths) of the first electrode 11 and the second electrode 12 along the X-axis direction are not less than 5 μm and not more than 300 μm.

The second substrate unit 20u includes a second substrate 20 and an opposing electrode 20c. The second substrate 20 has a second major surface 20a opposing the first major surface 10a. The opposing electrode 20c is provided on the second major surface 20a. The opposing electrode 20c overlays the multiple first electrodes 11 and the multiple second electrodes 12 when projected onto the X-Y plane. For example, the opposing electrode 20c extends in the X-Y plane.

The first substrate 10, the first electrodes 11, the second electrodes 12, the second substrate 20, and the opposing electrode 20c are transmissive with respect to light, and specifically, are transparent.

The first substrate 10 and the second substrate 20 may include, for example, a transparent material such as glass, a resin, etc. The first substrate 10 and the second substrate 20 have plate configurations or sheet configurations. For example, the thicknesses of the first substrate 10 and the second substrate 20 are not less than 50 μm and not more than 2000 μm. However, the thicknesses are arbitrary.

For example, the first electrode 11, the second electrode 12, and the opposing electrode 20c include an oxide including at least one (one type) of element selected from the group consisting of In, Sn, Zn, and Ti. These electrodes may include, for example, ITO. For example, at least one selected from $In_2O_3$ and $SnO_3$ may be used. For example, the thicknesses of these electrodes are about 200 nanometers (nm) (e.g., not less than 100 nm and not more than 350 nm). For example, the thicknesses of the electrodes are set to be thicknesses for which high transmittance with respect to visible light is obtained.

The liquid crystal layer 30 is provided between the first substrate unit 10u and the second substrate unit 20u. The liquid crystal layer 30 includes a liquid crystal material. The liquid crystal material may include a nematic liquid crystal (having a nematic phase at the temperature at which the liquid crystal optical apparatus 111 is used). The liquid crystal material has a positive dielectric anisotropy or a negative dielectric anisotropy. In the case of the positive dielectric anisotropy, for example, the initial arrangement of the liquid crystal of the liquid crystal layer 30 (when a voltage is not applied to the liquid crystal layer 30) is substantially a horizontal alignment (parallel alignment). In the case of the negative dielectric anisotropy, the initial arrangement of the liquid crystal of the liquid crystal layer 30 is substantially a vertical alignment. For the horizontal alignment in the specification of the application, the angle (the pretilt angle) between the director of the liquid crystal (the long axis of the liquid crystal molecules)

and the X-Y plane is not less than 0° and not more than 30°. For example, for the vertical alignment, the pretilt angle is not less than 60° and not more than 90°. The director of the liquid crystal of at least one selected from the initial arrangement and the arrangement during the voltage application has a component parallel to the X-axis direction.

Herein, the case is described where the dielectric anisotropy of the liquid crystal included in the liquid crystal layer 30 is positive and the initial arrangement is substantially the horizontal alignment.

In the case of the substantially horizontal alignment, the director is substantially parallel to the X-axis direction in the initial arrangement when projected onto the X-Y plane. For example, the angle (the absolute value of the angle) between the director and the X-axis direction is not more than 10 degrees when projected onto the X-Y plane. The orientation direction of the liquid crystal layer 30 proximal to the first substrate unit 10u is antiparallel to the orientation direction of the liquid crystal layer 30 proximal to the second substrate unit 20u. In other words, the initial alignment is not a splay alignment.

The first substrate unit 10u may further include an alignment film (not illustrated). The first electrodes 11 and the second electrodes 12 are disposed between the first substrate 10 and the alignment film of the first substrate unit 10u. The second substrate unit 20u may further include an alignment film (not illustrated). The opposing electrode 20c is disposed between the second substrate 20 and the alignment film of the second substrate unit 20u. These alignment films may include, for example, polyimide. For example, the initial arrangement of the liquid crystal layer 30 is obtained by performing rubbing of the alignment films. The direction of the rubbing of the first substrate unit 10u is antiparallel to the rubbing direction of the second substrate unit 20u. The initial alignment may be obtained by performing light irradiation of the alignment films.

The liquid crystal alignment of the liquid crystal layer 30 is changed by applying voltages between the opposing electrode 20c and the first electrodes 11 and between the opposing electrode 20c and the second electrodes 12. A refractive index distribution is formed in the liquid crystal layer 30 according to the change of the liquid crystal alignment. The travel direction of the light that is incident on the liquid crystal optical apparatus 111 is changed by the refractive index distribution. The change of the travel direction of the light is mainly based on the refraction effect.

The drive unit 72 is electrically connected to the first electrodes 11, the second electrodes 12, and the opposing electrode 20c. The drive unit 72 forms a refractive index distribution RD in the liquid crystal layer 30 by applying the voltages to the first electrodes 11, the second electrodes 12, and the opposing electrode 20c. The drive unit 72 forms the refractive index distribution in the liquid crystal layer 30 by controlling the potential difference between the opposing electrode 20c and the first electrodes 11 and the potential difference between the opposing electrode 20c and the second electrodes 12. The liquid crystal optical apparatus 111 is a dispersed refractive index-type liquid crystal optical apparatus. A drive device 100 that has substantially the same functions as the drive unit 72 may be provided separately from the liquid crystal optical apparatus 111.

Figure 2:
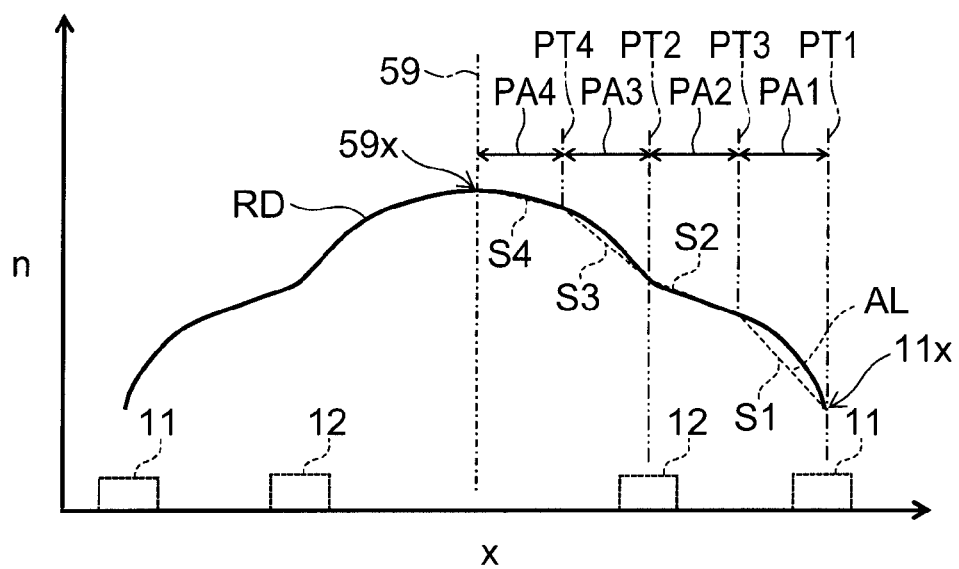
FIG. 2 is a graph illustrating an optical characteristic of the liquid crystal optical apparatus according to the embodiment.

FIG. 2 is a graph illustrating an optical characteristic of the liquid crystal optical apparatus according to the embodiment.

The horizontal axis of FIG. 2 is an X-axis direction position x. The vertical axis of FIG. 2 is a refractive index n.

FIG. 2 schematically illustrates the distribution curve of the refractive index in the X-Z plane (the plane parallel to the X-axis direction and the Z-axis direction) of the refractive index distribution RD that the drive unit 72 forms in the liquid crystal layer 30.

In the refractive index distribution RD as shown in FIG. 2, the refractive index monotonously increases from the first electrode 11 toward the central axis 59. The refractive index distribution RD monotonously increases from an end portion 11x on the second-direction position of the second-direction center of the first electrode 11 toward a central portion 59x on the second-direction position of the central axis 59. The refractive index distribution RD has no portion where the refractive index decreases in the direction from the first electrode 11 toward the central axis 59.

A portion of the refractive index distribution RD proximal to the first electrode 11 is a first portion PA1. A portion of the refractive index distribution RD between the first portion PA1 and the central axis 59 is a second portion PA2. A portion of the refractive index distribution RD between the second portion PA2 and the central axis 59 is a third portion PA3. At least a portion of the refractive index distribution RD between the third portion PA3 and the central axis 59 is a fourth portion PA4.

The slope (the degree of the change of the refractive index with respect to the change of the X-axis direction position) of the refractive index distribution RD of the first portion PA1 is a first slope S1. The slope of the refractive index distribution RD of the second portion PA2 is a second slope S2. The slope of the refractive index distribution RD of the third portion PA3 is a third slope S3. The slope of the refractive index distribution RD of the fourth portion PA4 is a fourth slope S4. In the refractive index distribution RD, the second slope S2 is smaller than the first slope S1. The third slope S3 is larger than the second slope S2. The fourth slope S4 is smaller than the third slope S3.

The X-axis direction center position of the first electrode 11 is a first position PT1. The X-axis direction center position of the second electrode 12 is a second position PT2. The X-axis direction center position between the first position PT1 and the second position PT2 is a third position PT3. The X-axis direction center position between the second position PT2 and the central axis 59 is a fourth position PT4.

For example, the first portion PA1 is the portion between the first position PT1 and the third position PT3. For example, the second portion PA2 is the portion between the third position PT3 and the second position PT2. For example, the third portion PA3 is the portion between the second position PT2 and the fourth position PT4. For example, the fourth portion PA4 is the portion between the fourth position PT4 and the central axis 59. The first portion PA1, the second portion PA2, the third portion PA3, and the fourth portion PA4 may be any portion of the refractive index distribution RD between the central axis 59 and the first electrode 11.

For example, the first slope S1 is the slope of a straight-line approximation AL of the curve of the refractive index distribution RD of the first portion PA1. For example, the second slope S2 is the slope of the straight-line approximation AL of the curve of the refractive index distribution RD of the second portion PA2. For example, the third slope S3 is the slope of the straight-line approximation AL of the curve of the refractive index distribution RD of the third portion PA3. For example, the fourth slope S4 is the slope of the straight-line approximation AL of the curve of the refractive index distribution RD of the fourth portion PA4.

Thus, the first increase rate (the first slope S1) of the refractive index of the first portion PA1 of the refractive index distribution RD is higher than the second increase rate (the second slope S2) of the refractive index of the second portion PA2 of the refractive index distribution RD between the first portion PA1 and the central portion 59x.

The second increase rate is lower than the third increase rate (the third slope S3) of the refractive index of the third portion PA3 of the refractive index distribution RD between the second portion PA2 and the central portion 59x.

The third increase rate is higher than the fourth increase rate (the fourth slope S4) of the refractive index of the fourth portion PA4 of the refractive index distribution RD between the third portion PA3 and the central portion 59x.

The drive unit 72 applies a first voltage V1 between the opposing electrode 20c and the first electrodes 11 and applies a second voltage V2 between the opposing electrode 20c and the second electrodes 12. For convenience herein, the state in which the potential is the same (is zero volts) between two electrodes also is taken to be included in the state in which the voltage is applied.

The absolute value of the first voltage V1 is greater than the absolute value of the second voltage V2. The first voltage V1 and the second voltage V2 may be direct-current voltages or alternating current voltages. In the case of alternating current voltages, the effective value (root mean square value) of the first voltage V1 is greater than the effective value (root mean square value) of the second voltage V2.

The potential of the opposing electrode 20c may be fixed; and the potential of at least one selected from the first electrode 11 and the second electrode 12 may be changed as alternating current. For example, the absolute value (the effective value) of the first voltage V1 can be relatively large by supplying a voltage having a polarity opposite to the polarity of the change of the potential of the opposing electrode 20c to the first electrode 11. By such a driving method, the power supply voltage of the drive circuit can be small; and the breakdown voltage specification of the drive IC can be relaxed.

In the case where the pretilt angle of the liquid crystal layer 30 is relatively small (e.g., not more than 10 degrees), a threshold voltage Vth relating to the change of the liquid crystal alignment of the liquid crystal layer 30 is relatively distinct. In such a case, for example, the first voltage V1 and the second voltage V2 are set to be greater than the threshold voltage Vth.

The first voltage V1 and the second voltage V2 are the voltages that change the liquid crystal alignment of the liquid crystal layer 30 from the initial arrangement. The liquid crystal alignment of the liquid crystal layer 30 is changed by the voltage applied to each of the electrodes; and the refractive index distribution RD recited above is formed based on this change. For example, in the case where the dielectric anisotropy of the liquid crystal layer 30 is positive and the orientation direction of the liquid crystal is vertical when the voltage is applied and horizontal when the voltage is not applied, the drive unit 72 controls the absolute value (the effective value) of the first voltage V1 to be, for example, not less than 4 V (volts) and not more than 20 V when forming the refractive index distribution RD. For example, the drive unit 72 controls the absolute value (the effective value) of the second voltage V2 to be not less than 1 V and not more than 10 V.

For example, in the liquid crystal optical apparatus 111, a uniform refractive index distribution is formed in the liquid crystal layer 30 in the case where the voltage between the opposing electrode 20c and the first electrodes 11 and the voltage between the opposing electrode 20c and the second electrodes 12 are not more than the threshold voltage Vth. In such a case, the travel direction of the light that is incident on the liquid crystal optical apparatus 111 substantially does not change.

Figure 3:
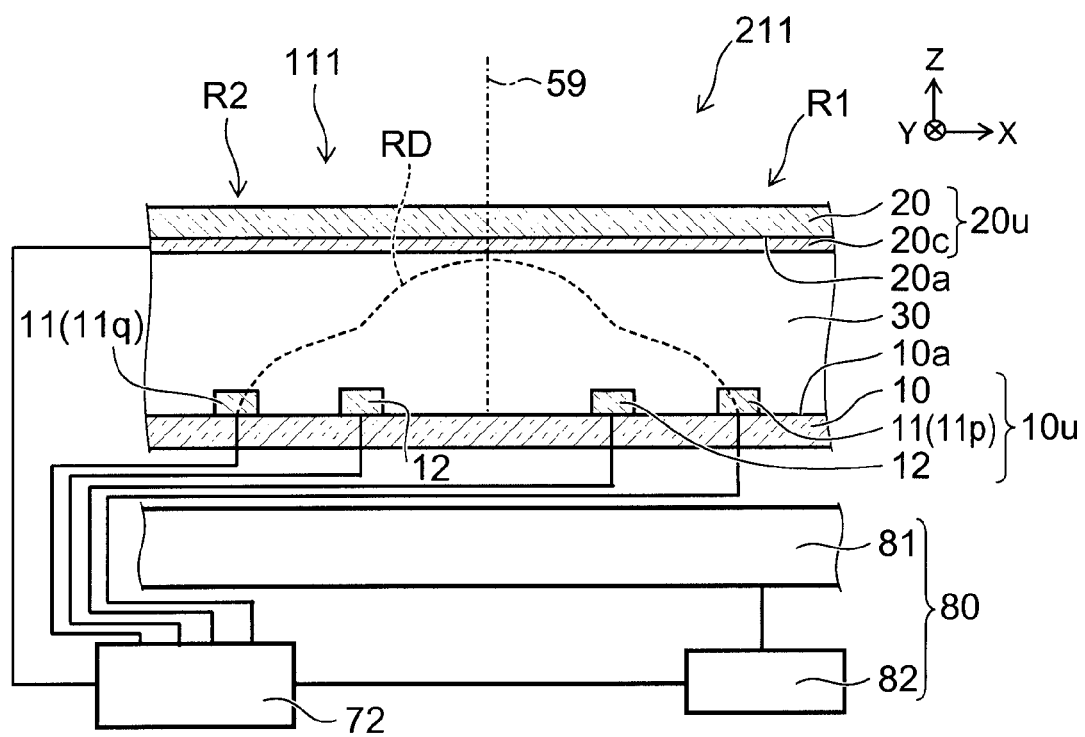
FIG. 3 is a schematic view illustrating the configuration of the liquid crystal optical apparatus according to the embodiment.

FIG. 3 is a schematic view illustrating the configuration of the liquid crystal optical apparatus according to the embodiment.

FIG. 3 also shows an example of the state of use of the liquid crystal optical apparatus 111. The liquid crystal optical apparatus 111 is used with an image display unit 80. The image display device 211 according to the embodiment includes any of the liquid crystal optical apparatuses according to the embodiment (in this example, the liquid crystal optical apparatus 111) and the image display unit 80. Any display device may be used as the image display unit 80. For example, a liquid crystal display device, an organic EL display device, a plasma display, etc., may be used.

The image display unit 80 includes a display unit 81. The display unit 81 is stacked with the liquid crystal optical apparatus 111. The display unit 81 causes the light including image information to be incident on the liquid crystal layer 30. In this example, the light enters the liquid crystal layer 30 via the first substrate unit 10u and is emitted to the outside via the second substrate unit 20u.

The light is in a linearly-polarized light state traveling in substantially the Z-axis direction. The polarizing axis of the linearly-polarized light (the orientation axis in the X-Y plane which is the vibration plane of the electric field) is the X-axis direction. In other words, the polarizing axis of the linearly-polarized light is a direction parallel to the director (the long axis) of the liquid crystal molecules of the liquid crystal layer 30. The linearly-polarized light is formed by, for example, disposing an optical filter (a polarizer) having the X-axis direction as the polarizing axis along the optical path.

The image display unit 80 may further include a display drive unit 82 that drives the display unit 81. The display drive unit 82 supplies a drive signal to the display unit 81. The display unit 81 produces light that is modulated based on the drive signal from the display drive unit 82.

The liquid crystal optical apparatus 111 has an operating state that modifies the optical path and an operating state that substantially does not modify the optical path by the voltages applied to the first electrodes 11, the second electrodes 12, and the opposing electrode 20c. For example, the image display device 211 provides a three-dimensional display by the light being incident on the liquid crystal optical apparatus 111 in the operating state that modifies the optical path. For example, the image display device 211 provides a two-dimensional image display in the operating state that substantially does not modify the optical path.

The drive unit 72 may be connected to the display drive unit 82 by a wired or wireless method (an electrical method, an optical method, etc.). The image display device 211 may further include a control unit (not illustrated) that controls the drive unit 72 and the display drive unit 82.

There is a liquid crystal optical apparatus that forms a refractive index distribution having a Fresnel lens-like configuration in the liquid crystal layer 30 by providing four or more electrodes between the two most proximal first electrodes 11 and by adjusting the voltage applied to each of the electrodes. Also, for example, there is a liquid crystal optical apparatus that forms a refractive index distribution having a convex lens configuration in the liquid crystal layer 30 by applying the voltage between the opposing electrode 20c and the multiple first electrodes 11. For the configuration that forms the refractive index distribution having the Fresnel lens-like configuration, the thickness of the liquid crystal layer 30 can be thinner than for the configuration that forms the refractive index distribution having the convex lens configuration. Also, the response rate of the liquid crystal layer 30 when switching between the operating state that modifies the optical path and the operating state that substantially does not modify the optical path can be higher.

However, the configuration that forms the refractive index distribution having the Fresnel lens-like configuration is problematic in that a reverse slope is formed in the liquid crystal layer 30. The reverse slope is a slope toward a direction that is different from the focus of the lens formed by the refractive index distribution. For example, in FIG. 2, the first slope S1 to the fourth slope S4 in the first region R1 have slopes toward the upper left. In the case where the slope toward the upper left is forward in the liquid crystal layer 30 of the first region R1 of the liquid crystal optical apparatus 111, the reverse slope is a slope toward the lower left.

The light concentrated by the reverse slope of the liquid crystal layer 30 leaks in as an interference parallax called offset luminance. The reverse slope of the liquid crystal layer 30 causes crosstalk of the parallax image during the three-dimensional display and impedes the stereoscopic viewing by the human viewer. Further, it is necessary to apply relatively high voltages to the electrodes to suppress the reverse slope in the configuration that forms the refractive index distribution having the Fresnel lens-like configuration. However, when the high voltages are applied to the electrodes, components that are not in the orientation direction occur when the liquid crystal becomes vertical; alignment defects of the liquid crystal occur easily; and the target refractive index distribution unfortunately cannot be obtained.

On the other hand, the occurrence of the reverse slope can be suppressed in the refractive index distribution RD that is formed by the liquid crystal optical apparatus 111. Thereby, the occurrence of the crosstalk in the liquid crystal optical apparatus 111 can be suppressed. In the liquid crystal optical apparatus 111, a high-quality display is possible. The formation of the refractive index distribution RD can be realized by applying a relatively low voltage. Compared to the refractive index distribution of the convex lens configuration, the thickness of the liquid crystal layer 30 can be thinner and the response rate can be faster for the refractive index distribution RD. In the liquid crystal optical apparatus 111, the leakage of the offset luminance can be reduced and 3D display degradation can be reduced by forming a gentle jump between levels using a low voltage.

Figure 4:
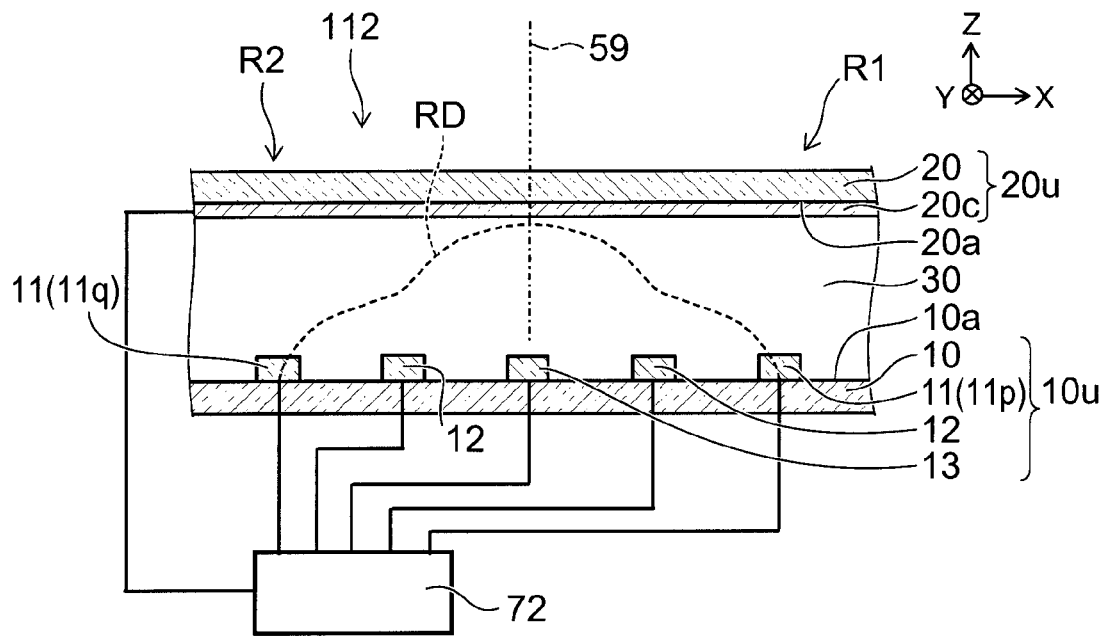
FIG. 4 is a schematic view illustrating another configuration of the liquid crystal optical apparatus according to the embodiment.

FIG. 4 is a schematic view illustrating another configuration of the liquid crystal optical apparatus according to the embodiment.

As shown in FIG. 4, the first substrate unit 10u of the liquid crystal optical apparatus 112 further includes multiple third electrodes 13. The multiple third electrodes 13 are provided on the first major surface 10a. The multiple third electrodes 13 extend in the Y-axis direction. Each of the third electrodes 13 is provided at a position overlaying the central axis on the first major surface 10a. For example, the third electrode 13 is provided at the X-axis direction center between the two most proximal first electrodes 11. In other words, the third electrode 13 is provided on the central axis 59. The multiple third electrodes 13 are electrically connected to the drive unit 72. The drive unit 72 further controls the potential difference between the opposing electrode 20c and the third electrodes 13 when forming the refractive index distribution RD.

The drive unit 72 applies the first voltage V1 between the opposing electrode 20c and the first electrodes 11, applies the second voltage V2 between the opposing electrode 20c and the second electrodes 12, and applies a third voltage V3 between the opposing electrode 20c and the third electrode 13. The absolute value (the effective value) of the first voltage V1 is greater than the absolute value (the effective value) of the third voltage V3. The absolute value (the effective value) of the second voltage V2 is greater than the absolute value (the effective value) of the third voltage V3. For example, the absolute value (the effective value) of the third voltage V3 can be relatively small by the potential of the opposing electrode 20c being changed as alternating current and by supplying a voltage having the same polarity as the polarity of the change to the third electrode 13. For example, the third voltage V3 is set to be not more than the threshold voltage Vth relating to the change of the liquid crystal alignment of the liquid crystal layer 30. For example, the third voltage V3 is a voltage that maintains the liquid crystal alignment of the liquid crystal layer 30 to be the initial arrangement or an alignment state near the initial arrangement. For example, the absolute value (the effective value) of the third voltage V3 is not less than 0 V and not more than 2 V.

Thus, the refractive index distribution RD can be formed more appropriately by providing the third electrode 13 in the first substrate unit 10u and by applying the third voltage V3 to the third electrode 13.

Figure 5:
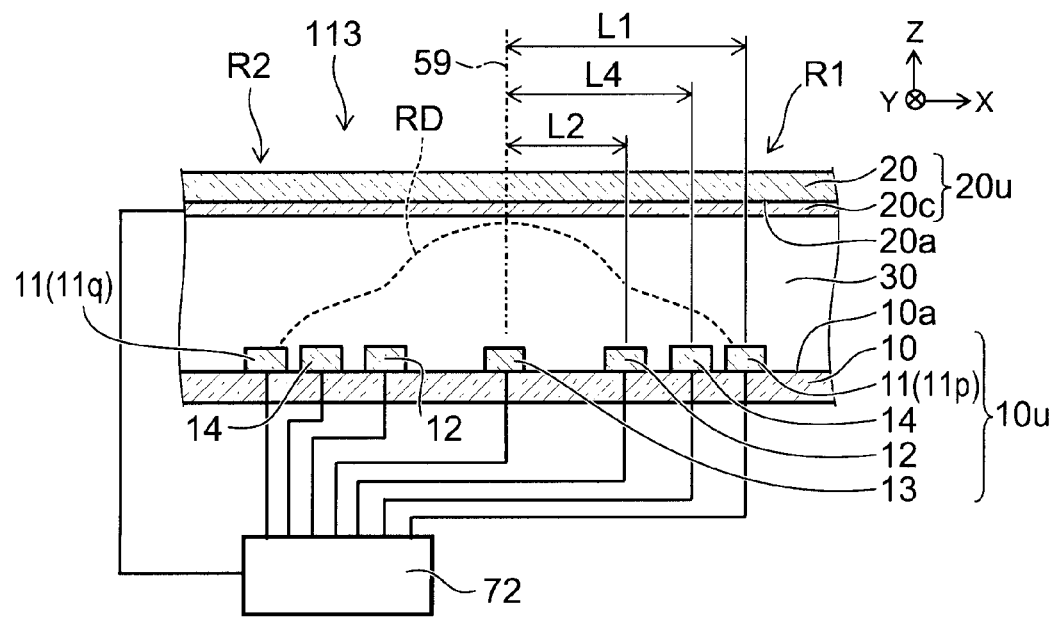
FIG. 5 is a schematic view illustrating another configuration of the liquid crystal optical apparatus according to the embodiment.

FIG. 5 is a schematic view illustrating another configuration of the liquid crystal optical apparatus according to the embodiment.

As shown in FIG. 5, the first substrate unit 10u of the liquid crystal optical apparatus 113 further includes multiple fourth electrodes 14. The multiple fourth electrodes 14 are provided on the first major surface 10a. The multiple fourth electrodes 14 extend in the Y-axis direction. The multiple fourth electrodes 14 are provided respectively in the regions between the first electrode 11 and the second electrode 12. One of the multiple fourth electrodes 14 is disposed between one of the two most proximal first electrodes 11 (the electrode 11p) and the second electrode 12 disposed between the central axis 59 and the one of the two most proximal first electrodes 11 (the electrode 11p). One other of the multiple fourth electrodes 14 is disposed between the other of the two most proximal first electrodes 11 (the electrode 11q) and the second electrode 12 disposed between the central axis 59 and the other of the two most proximal first electrodes 11 (the electrode 11q).

For example, two fourth electrodes 14 are provided between the two most proximal first electrodes 11. The two fourth electrodes 14 are provided respectively between one of the two most proximal first electrodes 11 and one of the two second electrodes 12 and between the other of the two most proximal first electrodes 11 and the other of the two second electrodes 12. Each of the multiple fourth electrodes 14 is electrically connected to the drive unit 72. The drive unit 72 further controls the potential difference between the opposing electrode 20c and the fourth electrodes 14 when forming the refractive index distribution RD.

For example, the one fourth electrode 14 that exists in the first region R1 and the one fourth electrode 14 that exists in the second region R2 are disposed with substantially line symmetry with the central axis 59 as an axis of symmetry. However, this may not be a rigorous line symmetry. A distance L4 is the distance from the X-axis direction center position of the fourth electrode 14 to the central axis 59. In such a case, for example, the distance L4 is not less than 55% and not more than 80% of the distance L1. The drive unit 72 applies the first voltage V1 between the opposing electrode 20c and the first electrodes 11, applies the second voltage V2 between the opposing electrode 20c and the second electrodes 12, applies the third voltage V3 between the opposing electrode 20c and the third electrode 13, and applies a fourth voltage V4 between the opposing electrode 20c and the fourth electrodes 14. For example, it is desirable for the absolute value (the effective value) of the fourth voltage V4 to be less than the absolute value (the effective value) of the first voltage V1 and for the absolute value (the effective value) of the fourth voltage V4 to be a voltage within about ±0.5 V of the absolute value (the effective value) of the second voltage V2. For example, the absolute value (the effective value) of the fourth voltage V4 is not less than 0.5 V and not more than 3 V.

Thus, the refractive index distribution RD can be formed more appropriately by providing the fourth electrodes 14 in the first substrate unit 10u and by applying the fourth voltage V4 to the fourth electrodes 14.

Figure 6:
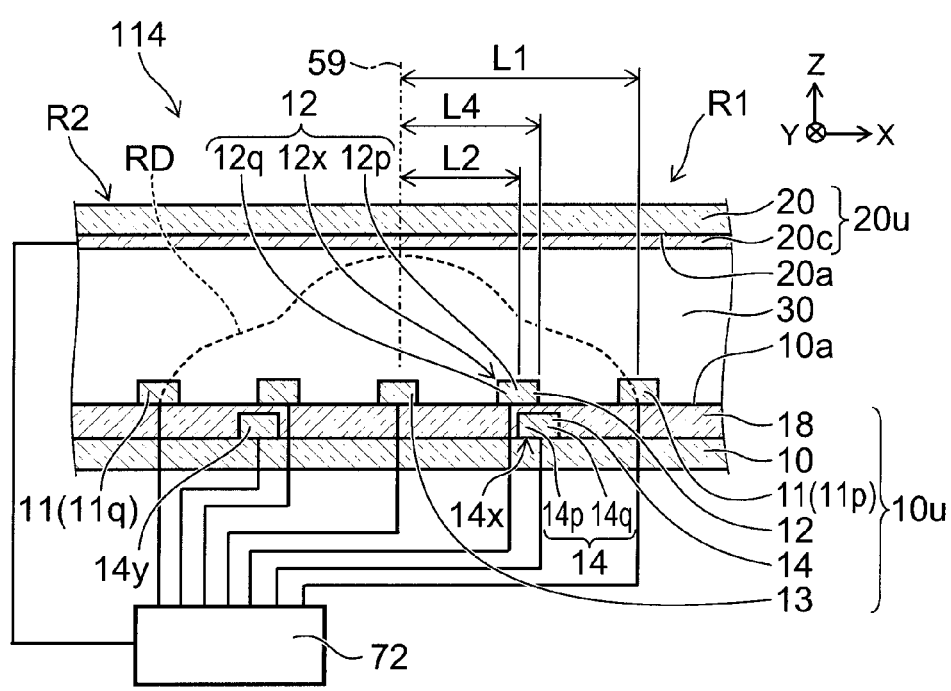
FIG. 6 is a schematic view illustrating another configuration of the liquid crystal optical apparatus according to the embodiment.

FIG. 6 is a schematic view illustrating another configuration of the liquid crystal optical apparatus according to the embodiment.

In addition to the second electrodes 12 and the third electrode 13 as shown in FIG. 6, the first substrate unit 10u of the liquid crystal optical apparatus 114 further includes an insulating layer 18 and the multiple fourth electrodes 14.

The insulating layer 18 is provided between the substrate 10 and the second electrodes 12. The multiple fourth electrodes 14 are provided between the substrate 10 and the insulating layer 18. The multiple fourth electrodes 14 extend in the first direction.

The position of one fourth electrode 14x of the multiple fourth electrodes 14 along the second direction is between the position of the one of the two most proximal first electrodes 11 (the electrode 11p) along the second direction and the position of the central axis 59 along the second direction.

The position of one other fourth electrode 14y of the multiple fourth electrodes 14 along the second direction is between the position of the other of the two most proximal first electrodes 11 (the electrode 11q) along the second direction and the position of the central axis 59 along the second direction.

A portion of the fourth electrode 14 is stacked with the second electrode 12 in the Z-axis direction. In this example, the multiple fourth electrodes 14 are provided on the first major surface 10a of the first substrate 10; and the insulating layer 18 is provided on the multiple fourth electrodes 14 and the first major surface 10a. The first electrodes 11, the second electrodes 12, and the third electrode 13 are provided on the insulating layer 18.

In this example as illustrated in FIG. 6, the second electrode 12 (a second electrode 12x) disposed between the central axis 59 and the one of the two most proximal first electrodes 11 (the electrode 11p) has a first superimposed portion 12p overlaying the one fourth electrode 14x recited above and a first non-superimposed portion 12q not overlaying the one fourth electrode 14x when projected onto a plane (the X-Y plane) parallel to the X-axis direction and the Y-axis direction.

The one fourth electrode 14x recited above has a second superimposed portion 14p overlaying the second electrode 12 (the second electrode 12x) disposed between the central axis 59 and the one of the two most proximal first electrodes 11 (the electrode 11p) and a second non-superimposed portion 14q not overlaying this second electrode 12 (the second electrode 12x) when projected onto the X-Y plane.

The insulating layer 18 is provided between the second electrode 12 and the fourth electrode 14 to insulate the second electrode 12 and the fourth electrode 14. The insulating layer 18 may include, for example, $SiO_2$, an organic insulating film, etc. For example, the thickness of the insulating layer 18 is not less than 100 nm and not more than 2000 nm. Thereby, appropriate insulative properties and high optical transmittance are obtained. In this example, the distance L4 is, for example, not less than 40% and not more than 80%; and it is favorable to be as proximal as possible to the second electrode 12. In this example, the absolute value (the effective value) of the fourth voltage V4 is, for example, not less than 0.5 V and not more than 3 V.

Thus, the refractive index distribution RD can be formed more appropriately by stacking the second electrode 12 and the fourth electrode 14 in the Z-axis direction to form an overlaying portion and a non-overlaying portion when projected onto the X-Y plane. For example, it is easier to finely adjust the refractive index distribution RD. The insulating layer 18 may be formed on the second electrodes 12; and the fourth electrodes 14 may be formed on the insulating layer 18. The first electrodes 11 and the third electrode 13 may be provided between the first substrate 10 and the insulating layer 18.

An example of the design of the refractive index distribution RD will now be described.

Figure 7A:
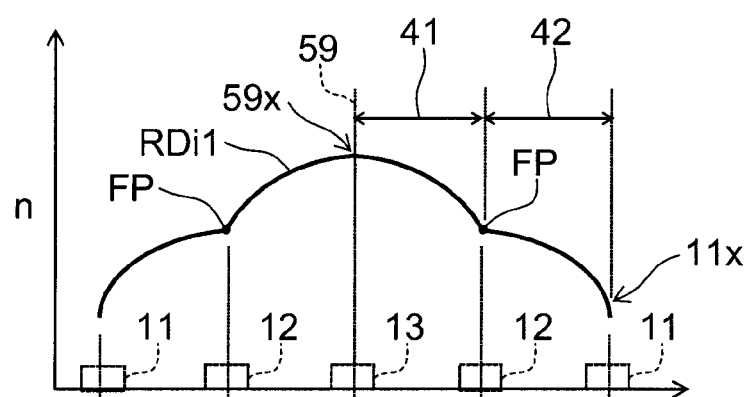
FIG. 7A and FIG. 7B are schematic views illustrating another configuration of the liquid crystal optical apparatus according to the embodiment.
Figure 7B:
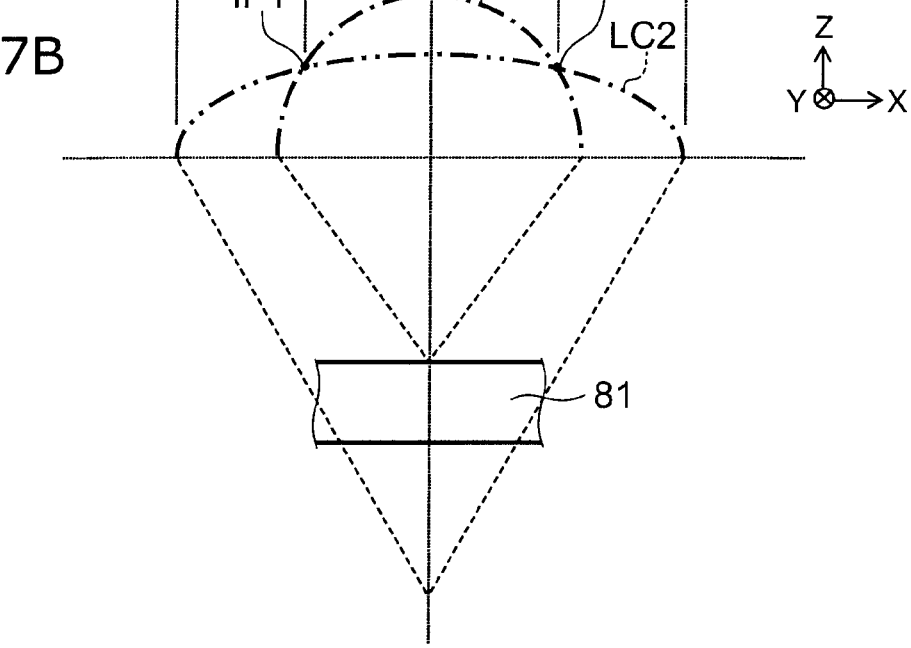

FIG. 7A and FIG. 7B are schematic views illustrating another configuration of the liquid crystal optical apparatus according to the embodiment.

FIG. 7A is a graph illustrating the refractive index distribution RD. FIG. 7B is a schematic view showing a design example of the refractive index distribution RD. In FIG. 7A, the horizontal axis is the X-axis direction position x; and the vertical axis is the refractive index n.

As shown in FIG. 7A and FIG. 7B, for example, a first lens curve LC1 and a second lens curve LC2 are prepared when designing the refractive index distribution RD. The first lens curve LC1 and the second lens curve LC2 are imaginary curves to examine the lens effect of the refractive index distribution RD.

The first lens curve LC1 has a semicircular configuration or a semielliptical configuration. The X-axis direction position of the optical center of the first lens curve LC1 is substantially the same as that of the central axis 59. The first lens curve LC1 has a focal point on the first substrate 10 side. For example, the focal distance of the first lens curve LC1 is matched to the distance between the liquid crystal optical apparatus and the display unit 81. For example, the first lens curve LC1 focuses the light toward the multiple pixels of the display unit 81 that forms the parallax image. The width of the first lens curve LC1 in the X-axis direction is less than the arrangement pitch of the multiple first electrodes 11.

The second lens curve LC2 has a semicircular configuration or a semielliptical configuration. The X-axis direction position of the optical center of the second lens curve LC2 is substantially the same as that of the central axis 59. The Z-axis direction position of the center of the second lens curve LC2 is substantially the same as the Z-axis direction position of the center of the first lens curve LC1. The second lens curve LC2 overlays the first lens curve LC1.

The second lens curve LC2 has a focal point on the first substrate 10 side. The width of the second lens curve LC2 in the X-axis direction is substantially the same as the arrangement pitch of the multiple first electrodes 11. The height (the length in the Z-axis direction) of the second lens curve LC2 is lower than the height of the first lens curve LC1. Accordingly, the focal distance of the second lens curve LC2 is longer than the focal distance of the first lens curve LC1. The height and/or the curvature of the second lens curve LC2 are adjusted such that the X-axis direction position of an intersection IP1 with the first lens curve LC1 is at the position of the second electrode 12.

From the central axis 59 to the intersection IP1, the curve is along the first lens curve LC1. From the intersection IP1 to the end portion on the first electrode 11 side, the curve is along the second lens curve LC2. Thereby, a refractive index distribution RDi1 is obtained.

In the refractive index distribution RDi1, a first focus portion 41 which has a first focal distance is formed between the central axis 59 and the second electrode 12; and a second focus portion 42 which has a second focal distance which is longer than the first focal distance is formed between the second electrode 12 and the first electrode 11.

The voltages applied to the electrodes are determined such that the refractive index distribution RD that is actually formed in the liquid crystal layer 30 approaches the refractive index distribution RDi1. However, the distribution slightly degrades from the refractive index distribution RDi1 as shown in FIG. 2 due to the error of the voltages that are applied, etc., in the actual driving state of the liquid crystal optical apparatus. In the refractive index distribution RD shown in FIG. 2, the third portion PA3 and the fourth portion PA4 correspond to the first focus portion 41; and the first portion PA1 and the second portion PA2 correspond to the second focus portion 42.

For example, the first lens curve LC1 is an imaginary refractive index distribution having a small lens pitch. For example, the second lens curve LC2 is an imaginary refractive index distribution having a large lens pitch. The refractive index distribution RDi1 has one flexion point FP between the first focus portion 41 and the second focus portion 42.

Figure 8A:
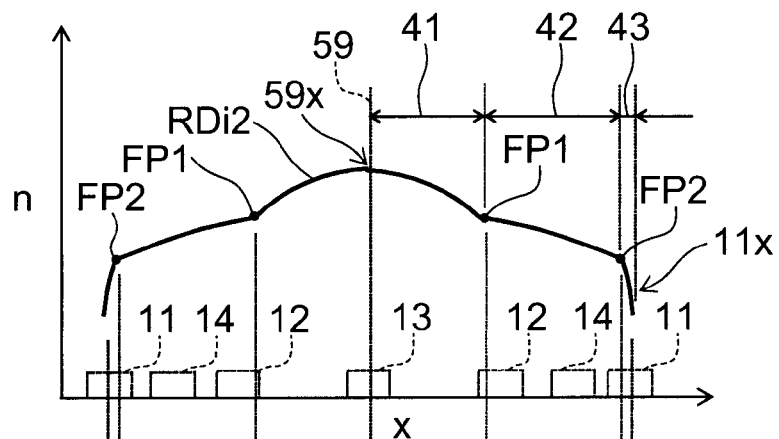
FIG. 8A and FIG. 8B are schematic views illustrating another configuration of the liquid crystal optical apparatus according to the embodiment.
Figure 8B:
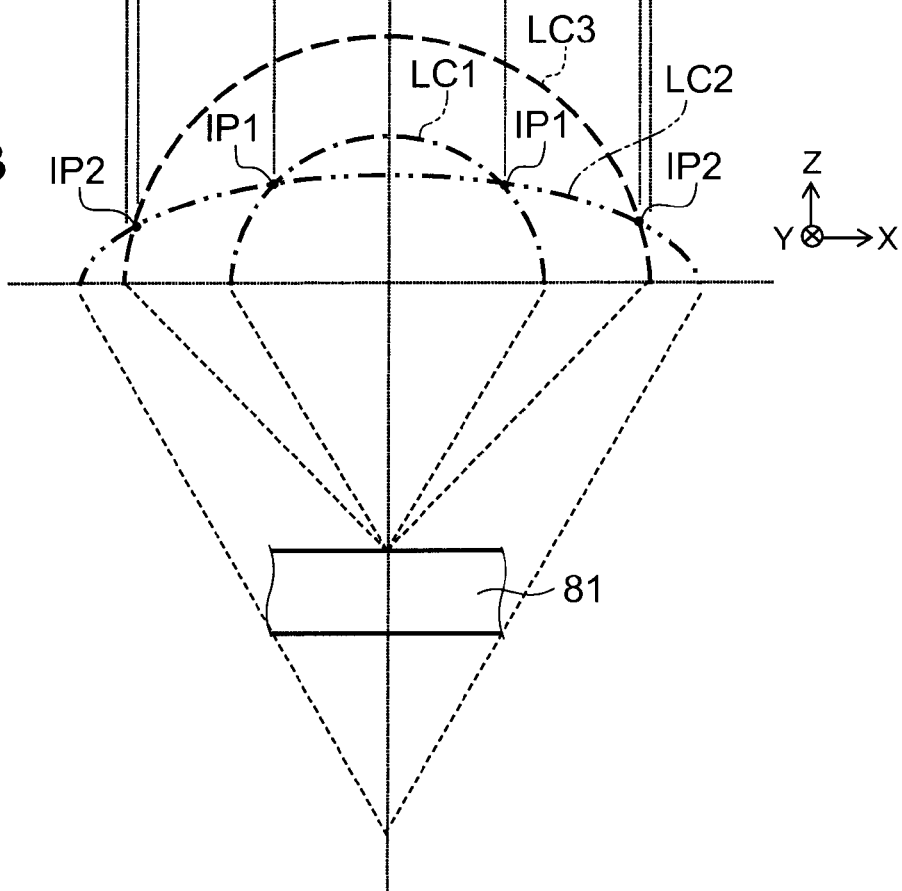

FIG. 8A and FIG. 8B are schematic views illustrating another configuration of the liquid crystal optical apparatus according to the embodiment.

FIG. 8A is a graph illustrating the refractive index distribution RD. FIG. 8B is a schematic view showing a design example of the refractive index distribution RD. In FIG. 8A, the horizontal axis is the X-axis direction position x; and the vertical axis is the refractive index n.

As shown in FIG. 8A and FIG. 8B, three curves may be used when designing the refractive index distribution RD.

In this example, the width of the second lens curve LC2 in the X-axis direction is greater than the arrangement pitch of the multiple first electrodes 11.

A third lens curve LC3 has a semicircular configuration or a semielliptical configuration. The X-axis direction position of the optical center of the third lens curve LC3 is substantially the same as that of the central axis 59. The Z-axis direction position of the center of the third lens curve LC3 is substantially the same as the Z-axis direction position of the center of the first lens curve LC1 and the Z-axis direction position of the center of the second lens curve LC2. The third lens curve LC3 overlays the first lens curve LC1 and the second lens curve LC2. The configuration of the first lens curve LC1 is enlarged to form the configuration of the third lens curve LC3. Accordingly, the focal distance of the third lens curve LC3 is substantially the same as the focal distance of the first lens curve LC1.

From the central axis 59 to the intersection IP1 in this example, the curve is along the first lens curve LC1. From the intersection IP1 to an intersection IP2 between the second lens curve LC2 and the third lens curve LC3, the curve is along the second lens curve LC2. From the intersection IP2 to the end portion on the first electrode 11 side, the curve is along the third lens curve LC3. Thereby, a refractive index distribution RDi2 is obtained.

In the refractive index distribution RDi2, the first focus portion 41 which has the first focal distance is formed between the central axis 59 and the second electrode 12; the second focus portion 42 which has the second focal distance which is longer than the first focal distance is formed in a portion between the second electrode 12 and the first electrode 11; and a third focus portion 43 which has substantially the same focal distance as the first focal distance is formed between the second focus portion 42 and the first electrode 11.

For example, the refractive index distribution RDi2 can be realized in the liquid crystal optical apparatus 113 that includes the fourth electrode 14 by the distance L4 of the fourth electrode 14 being not less than 40% and not more than 80% of the distance L1 and by the absolute value (the effective value) of the fourth voltage V4 being a voltage within about ±0.5 V of that of the second electrode 12.

In this example, the first lens curve LC1 is an imaginary refractive index distribution having, for example, a small lens pitch. For example, the second lens curve LC2 is an imaginary refractive index distribution having a large lens pitch. For example, the third lens curve LC3 is an imaginary refractive index distribution having a middle lens pitch. In the refractive index distribution RDi2, the lenses of the refractive index distributions that have the two different types, i.e., the middle type and the small type, of lens pitches with the same focal distance are connected by the refractive index distribution which has the maximum lens pitch and the focal distance that is longer than the focal distance recited above such that the focus horizontal position is substantially the same as that of the middle and small lenses recited above. The refractive index distribution RDi2 has two flexion points, i.e., a flexion point FP1 between the first focus portion 41 and the second focus portion 42 and a flexion point FP2 between the second focus portion 42 and the third focus portion 43.

In this example, in one lens made of the refractive index distribution configurations of the three different types, i.e., the large type, the middle type, and the small type, of lens pitches having the focal points at substantially the same focal distance and substantially the same horizontal position, the refractive index distribution (the third lens curve LC3) having the middle lens pitch is disposed at the lens end; the refractive index distribution from horizontal positions 1 (the intersections IP2) within the lens pitch at the intersections between the refractive index distribution of the middle lens pitch and the refractive index distribution (the second lens curve LC2) of the large lens pitch to horizontal positions 2 (the intersections IP1) within the lens pitch at the intersections between the refractive index distribution of the large lens pitch and the refractive index distribution (the first lens curve LC1) of the small lens pitch is the refractive index distribution of the large lens pitch; and the refractive index distribution from the horizontal positions 2 to the lens center is the refractive index distribution of the small lens pitch. Thereby, in the Fresnel lens, the slope at the jump between levels is formed only in the forward direction of the lens spherical surface; and the concentration of the light rays on the opposite parallax image can be suppressed.

The refractive index of the third lens curve LC3 is Nmiddle. In the case where the Fresnel lens is formed, although the actual center is the refractive index of the middle of the first lens curve LC1, the refractive index at the lens center of the third lens curve LC3 is $N_3$. The quadratic coefficient is $A_3$. The distance from the lens center is x. In such a case, Nmiddle is represented by Formula (1) recited below.

The refractive index of the liquid crystal with respect to polarized light having a polarizing axis orthogonal to the director direction of the liquid crystal is $N_0$. The refractive index with respect to polarized light having a polarizing axis parallel to the director direction of the liquid crystal is $N_e$. $N_e$ is greater than $N_0$. Half of the lens pitch of the third lens curve LC3 is Ip3$h$. In such a case, $A_3$ is represented by Formula (2) recited below.

The apparent thickness (the height) of the third lens curve LC3 in the Z-axis direction is t3. The thickness of the first lens curve LC1 in the Z-axis direction is t1. A focal distance f3 of the third lens curve LC3 is represented by Formula (3) recited below.

$$N\text{middle} = N_3 \cdot A_3 x^2 \quad (1)$$

$$N_3 = ((N_e - N_0)/t1) \times t3 + N_0 \quad (1A)$$

$$A_3 = (N_3 - N_0)/(Ip3h)^2 \quad (2)$$

$$f_3 = (Ip3h)^2/(2 \cdot (N_e - N_0) \cdot t3) \quad (3)$$

Substituting $N_e$ obtained from Formula (1A) recited above into $N_e$ of (3) gives $$f_3 = (Ip3h)^2/(2 \cdot (N_3 - N_0) \cdot t1) \quad (3A)$$

The refractive index of the first lens curve LC1 is Nsmall.
The refractive index at the lens center of the first lens curve LC1 is $N_1$. In such a case, Nsmall is represented by Formula (4) recited below.

$A_1$ is represented by Formula (5) recited below, where half of the lens pitch of the first lens curve LC1 is Ip1h.

A focal distance f1 of the first lens curve LC1 is represented by Formula (6) recited below, where the thickness (the height) of the first lens curve LC1 in the Z-axis direction is t1.

$$N\text{small} = N_1 \cdot A_1 x^2 \quad (4)$$

$$N_1 = ((N_e - N_0)/d\,t1) \times t1 + N_0 = N_e \quad (4A)$$

$$A_1 = (N_1 - N_0)/(Ip1h)^2 \quad (5)$$

$$f_1 = (Ip1h)^2/(2 \cdot (N_e - N_0) \cdot t1) \quad (6)$$

The refractive index of the second lens curve LC2 is Nlarge. The refractive index at the lens center of the second lens curve LC2 is $N_2$. In such a case, the refractive index distribution Nlarge of the second lens curve LC2 is represented by Formula (7) recited below.

$A_2$ is represented by Formula (8) recited below, where half of the lens pitch of the second lens curve LC2 is Ip2h.

A focal distance f2 of the second lens curve LC2 is represented by Formulas (9) and (10) recited below, where the thickness (the height) of the second lens curve LC2 in the Z-axis direction is tlarge.

$$N\text{large} = N_2 - A_2 x^2 \quad (7)$$

$$N_2 = ((N_e - N_0)/t1) \times t2 + N_0 \quad (7A)$$

$$A_2 = (N_2 - N_0)/(Ip2h)^2 \quad (8)$$

$$f_2 = (Ip2h)^2/(2 \cdot (N_e - N_0) \cdot t\text{large}) \quad (9)$$

On the other hand, substituting Formula (7A) into (9) gives $$f_2 = (Ip2h)^2/(2 \cdot (N_2 - N_0) \cdot t1) \quad (10)$$

From Formulas (3A), (6), and (10) recited above, to match the focal distances f1, f2, and f3 in the case where the thickness t1 is constant, the relationship between the lens pitches is $(N_1 - N_0) < (N_3 - N_0) < (N_2 - N_0)$ in the case where Ip1h<Ip3h<Ip2h.

Because $(N_2 - N_0) < (N_1 - N_0) < (N_3 - N_0)$ in the example shown in FIG. 8A and FIG. 8B, the condition of $(N_2 - N_0)$ does not satisfy the condition of the focal distance being constant.

Therefore, the focal distance of the second lens curve LC2 is longer; and defocus occurs as illustrated in FIG. 8B at the focal distance position of the middle and small lenses. For example, in the case where the lens pitch is substantially the same as that of the third lens curve LC3, the thickness of the liquid crystal layer 30 is 2/3; f=1.5 times; and defocus of about 1/3 of the lens pitch occurs. However, because there is no slope in the reverse direction, there is no light concentration component toward the opposite parallax image; and the offset luminance decreases.

Figure 9:
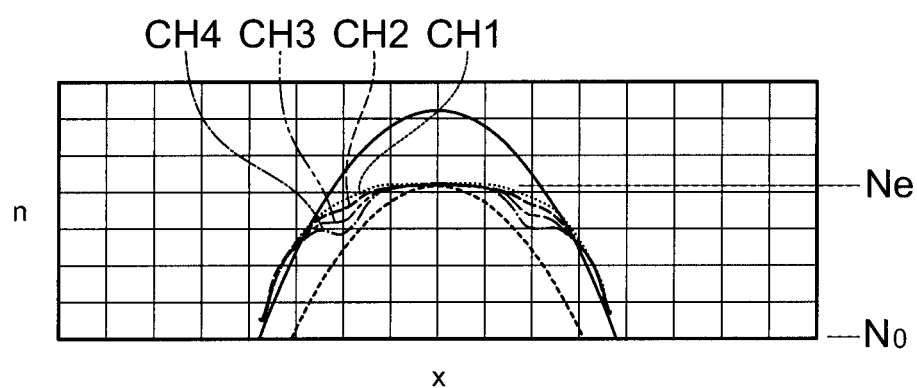
FIG. 9 is a graph illustrating characteristics of the liquid crystal optical apparatus according to the embodiment.

FIG. 9 is a graph illustrating characteristics of the liquid crystal optical apparatus according to the embodiment.

FIG. 9 is the result of a liquid crystal director simulation of the liquid crystal optical apparatus using a model of the configuration illustrated in FIG. 6. In FIG. 9, the horizontal axis is the X-axis direction position x; and the vertical axis is the refractive index n. FIG. 9 shows four types of characteristics CH1 to CH4 having different applied voltages. For the cross-sectional configuration illustrated in FIG. 6, the distance L2 was 50% of the distance L1; and the distance L4 was 55% of the distance L1. In this example, the thickness of the liquid crystal layer 30 was 40 µm; and the refractive index anisotropy of the liquid crystal material of the liquid crystal layer 30 was 0.2.

In the case where a designated voltage is applied as shown in FIG. 9 (in this example, the case where a voltage not less than 1 V and not more than 2 V is applied as the fourth voltage V4 which is the same as the second voltage V2, and a voltage not less than 5 V and not more than 12 V is applied to the first electrode 11), a characteristic near that of the refractive index distribution RDi2 illustrated in FIG. 8A is obtained.

Figure 10A:
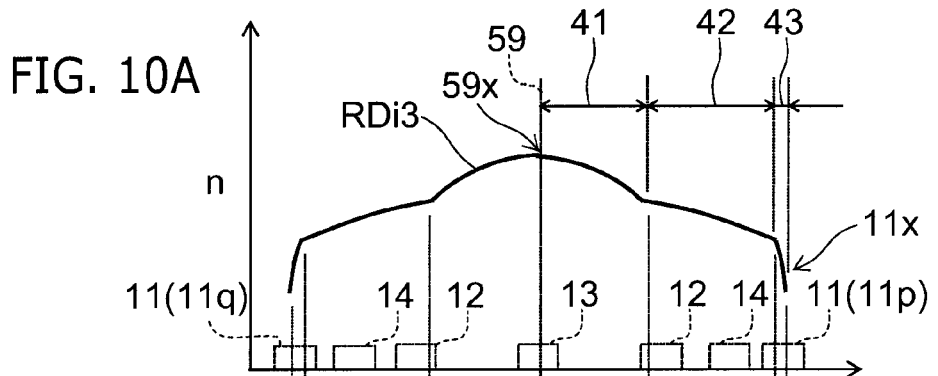
FIG. 10A and FIG. 10B are schematic views illustrating another configuration of the liquid crystal optical apparatus according to the embodiment.
Figure 10B:
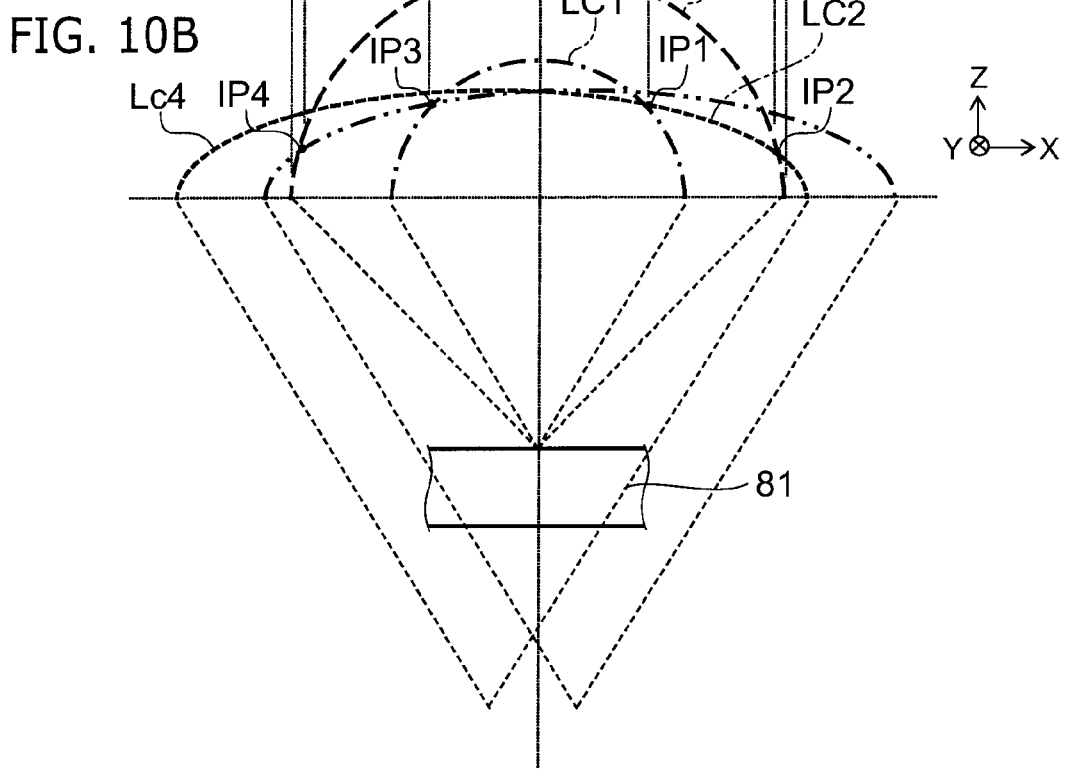

FIG. 10A and FIG. 10B are schematic views illustrating another configuration of the liquid crystal optical apparatus according to the embodiment.

FIG. 10A is a graph illustrating the refractive index distribution RD. FIG. 10B is a schematic view showing a design example of the refractive index distribution RD. In FIG. 10A, the horizontal axis is the X-axis direction position x; and the vertical axis is the refractive index n.

As shown in FIG. 10A and FIG. 10B, four curves may be used when designing the refractive index distribution RD.

In this example, the width of the second lens curve LC2 in the X-axis direction is greater than the arrangement pitch of the multiple first electrodes 11. The X-axis direction position of the optical center of the second lens curve LC2 is shifted in the +X direction from the X-axis direction position (the central axis 59) of the optical center of the first lens curve LC1. The second lens curve LC2 intersects the third lens curve LC3 at two points. The apex portion (the portion of the optical center) of the second lens curve LC2 is positioned inside the first lens curve LC1.

The configuration of a fourth lens curve LC4 is substantially the same as the configuration of the second lens curve LC2. The X-axis direction position of the optical center of the fourth lens curve LC4 is shifted in the −X direction from the X-axis direction position (the central axis 59) of the optical center of the first lens curve LC1. The absolute value of the shift amount of the fourth lens curve LC4 is substantially the same as the absolute value of the shift amount of the second lens curve LC2. In other words, the second lens curve LC2 and the fourth lens curve LC4 have substantially line symmetry with the central axis 59 as an axis of symmetry.

In this example, the intersection between the first lens curve LC1 and the fourth lens curve LC4 in the first region R1 is the intersection IP1. The intersection between the third lens curve LC3 and the fourth lens curve LC4 in the first region R1 is the intersection IP2. The intersection between the first lens curve LC1 and the second lens curve LC2 in the second region R2 is an intersection IP3. The intersection between the third lens curve LC3 and the second lens curve LC2 in the second region R2 is an intersection IP4.

From the central axis 59 to the intersection IP1 in this example, the curve is along the first lens curve LC1. From the intersection IP1 to the intersection IP2, the curve is along the fourth lens curve LC4. From the intersection IP2 to the end portion on the electrode 11p side, the curve is along the third lens curve LC3. From the central axis 59 to the intersection IP3 in this example, the curve is along the first lens curve LC1. From the intersection IP3 to the intersection IP4, the curve is along the second lens curve LC2. From the intersection IP4 to the end portion on the electrode 11q side, the curve is along the third lens curve LC3. Thereby, a refractive index distribution RDi3 is obtained.

Similarly to the refractive index distribution RDi2, the first focus portion 41, the second focus portion 42, and the third focus portion 43 are formed in the refractive index distribution RDi3. Compared to the refractive index distribution RDi2, the optical center of the second focus portion 42 is different from the optical centers of the first focus portion 41 and the third focus portion 43 in the refractive index distribution RDi3. On the other hand, compared to the refractive index distribution RDi2, the range of the defocus of the second focus portion 42 in the X-axis direction can be narrower for the refractive index distribution RDi3.

For example, in the case where the refractive index distribution RDi3 is formed in the liquid crystal optical apparatus 113 that includes the fourth electrode 14, it is desirable for the distance L4 of the fourth electrode 14 to be not less than 40% and not more than 80% of the distance L1 and for the absolute value (the effective value) of the fourth voltage V4 to be a voltage within about ±0.5 V of the absolute value of the second voltage.

In the case where the connection is performed by the large lenses (the second lens curve LC2 and the fourth lens curve LC4) in this example, the horizontal focal position of the refractive index distribution of the left side of the lens is shifted toward the right side; and the horizontal focal position of the refractive index distribution of the right side of the lens is shifted toward the left side. In other words, the shift of the light concentration position occurring due to the slope of the liquid crystal director being different for the light rays that are obliquely incident is corrected by pre-shifting the focal positions in the reverse direction by changing the voltages of the refractive index distributions having the largest lens pitches. Thereby, the defocus positions of the large lenses shift toward the middle; and the defocus range becomes narrow.

FIG. 11A and FIG. 11B are schematic views illustrating another configuration of the liquid crystal optical apparatus according to the embodiment.

FIG. 11A is a graph illustrating the refractive index distribution RD. FIG. 11B is a schematic view showing a design example of the refractive index distribution RD. In FIG. 11A, the horizontal axis is the X-axis direction position x; and the vertical axis is the refractive index n.

In this example, the width of the second lens curve LC2 in the X-axis direction is narrower than the width of the first lens curve LC1 in the X-axis direction. The height of the second lens curve LC2 is lower than the height of the first lens curve LC1. Thereby, the focal distance of the second lens curve LC2 is substantially the same as the focal distance of the first lens curve LC1. The X-axis direction position of the optical center of the second lens curve LC2 is shifted in the +X direction from the X-axis direction position (the central axis 59) of the optical center of the first lens curve LC1. The apex portion (the portion of the optical center) of the second lens curve LC2 is positioned inside the first lens curve LC1.

The configuration of the fourth lens curve LC4 is substantially the same as the configuration of the second lens curve LC2. The X-axis direction position of the optical center of the fourth lens curve LC4 is shifted in the −X direction from the X-axis direction position (the central axis 59) of the optical center of the first lens curve LC1. The absolute value of the shift amount of the fourth lens curve LC4 is substantially the same as the absolute value of the shift amount of the second lens curve LC2. In other words, the second lens curve LC2 and the fourth lens curve LC4 have substantially line symmetry with the central axis 59 as an axis of symmetry.

In this example, the intersection between the first lens curve LC1 and the second lens curve LC2 in the first region R1 is the intersection IP1. The intersection between the second lens curve LC2 and the third lens curve LC3 in the first region R1 is the intersection IP2. The intersection between the first lens curve LC1 and the fourth lens curve LC4 in the second region R2 is the intersection IP3. The intersection between the third lens curve LC3 and the fourth lens curve LC4 in the second region R2 is the intersection IP4.

From the central axis 59 to the intersection IP1 in this example, the curve is along the first lens curve LC1. From the intersection IP1 to the intersection IP2, the curve is along the second lens curve LC2. From the intersection IP2 to the end portion on the electrode 11p side, the curve is along the third lens curve LC3. From the central axis 59 to the intersection IP3 in this example, the curve is along the first lens curve LC1. From the intersection IP3 to the intersection IP4, the curve is along the fourth lens curve LC4. From the intersection IP4 to the end portion on the electrode 11q side, the curve is along the third lens curve LC3. Thereby, a refractive index distribution RDi4 is obtained.

The refractive index distribution RDi4 has the first focus portion 41, the second focus portion 42, and the third focus portion 43. The first focus portion 41 is provided between the central axis 59 and the second electrode 12. The first focus portion 41 has the first focal distance. The second focus portion 42 is provided in a portion between the second electrode 12 and the first electrode 11. The optical center of the second focus portion 42 is different from the optical center of the first focus portion 41. The focal distance of the second focus portion 42 is substantially the same as the first focal distance. The third focus portion 43 is provided between the second focus portion 42 and the first electrode 11. The optical center of the third focus portion 43 is substantially the same as the optical center of the first focus portion 41. The focal distance of the third focus portion 43 is substantially the same as the first focal distance.

Compared to the refractive index distribution RDi3, the shift amount of the optical center of the second focus portion 42 from the optical centers of the first focus portion 41 and the third focus portion 43 is larger for the refractive index distribution RDi4. On the other hand, compared to the refractive index distribution RDi3, the defocus amount of the second focus portion 42 can be suppressed for the refractive index distribution RDi4.

For example, in the case where the refractive index distribution RDi4 is formed in the liquid crystal optical apparatus 113 that includes the fourth electrode 14, it is desirable for the distance L4 of the fourth electrode 14 to be not less than 40% and not more than 80% of the distance L1 and for the absolute value (the effective value) of the fourth voltage V4 to be a voltage within about ±0.5 V of the absolute value of the second voltage V2.

In the case where the connection is performed by the small lenses (the second lens curve LC2 and the fourth lens curve LC4) in this example, the horizontal focal position of the refractive index distribution of the left side of the lens is shifted toward the left side; and the horizontal focal position of the refractive index distribution of the right side of the lens is shifted toward the right side. In other words, in one lens made of the refractive index distribution configurations of the three different types, i.e., the large type, the middle type, and the small type, of lens pitches having the focal points at substantially the same focal distance and substantially the same horizontal position, the refractive index distribution (the third lens curve LC3) having the large lens pitch is disposed at the lens end; the refractive index distribution from the horizontal positions 1 (the intersection IP2 and the intersection IP4) within the lens pitch at the intersections between the refractive index distributions of the small lens pitch and the refractive index distribution of the large lens pitch to the horizontal positions 2 (the intersection IP1 and the intersection IP3) within the lens pitch at the intersections between the refractive index distributions of the small lens pitch and the refractive index distribution (the first lens curve LC1) of the middle lens pitch is the refractive index distribution of the small lens pitch; the refractive index distribution from the horizontal positions 2 to the lens center is the refractive index distribution of the middle size; and the horizontal focal positions of the small size are shifted toward the left side for the refractive index distribution positioned on the left side of the lens and toward the right side for the refractive index distribution positioned on the right side of the lens.

Thus, although there is no defocus due to the defocus positions of the large lenses being shifted within the position of the pixel, the pixel information that is emitted is wider. By forming the slope at the jump between levels only in the forward direction of the lens spherical surface in the Fresnel lens, the concentration of the light rays on the opposite parallax image can be suppressed.

According to the embodiments, a liquid crystal optical apparatus and an image display device that provide a high quality display can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the invention is not limited to these specific examples. For example, one skilled in the art may similarly practice the invention by appropriately selecting specific configurations of components included in liquid crystal optical apparatuses such as first substrate units, second substrate units, liquid crystal layers, first substrates, second substrates, first to fourth electrodes, insulating layers, and drive units and specific configurations of components included in image display devices such as display units, display drive units, etc., from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all liquid crystal optical apparatuses and image display devices practicable by an appropriate design modification by one skilled in the art based on the liquid crystal optical apparatuses and the image display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. A liquid crystal optical apparatus, comprising:
a first substrate unit including
    a first substrate having a first major surface,
    a plurality of first electrodes provided on the first major surface, the first electrodes extending in a first direction and being arranged in a direction non-parallel to the first direction, and
    a plurality of second electrodes provided on the first major surface to extend in the first direction, one of the second electrodes being disposed between a central axis and one of the two most proximal first electrodes, one other of the second electrodes being disposed between the central axis and the other of the two most proximal first electrodes, the central axis being parallel to the first direction to pass through a midpoint of a line segment connecting centers of the two most proximal first electrodes in a second direction parallel to the first major surface and perpendicular to the first direction;
a second substrate unit including
    a second substrate having a second major surface opposing the first major surface, and
    an opposing electrode provided on the second major surface to oppose the first electrodes and the second electrodes;
a liquid crystal layer provided between the first substrate unit and the second substrate unit; and
a drive unit electrically connected to the first electrodes, the second electrodes, and the opposing electrode and configured to form a refractive index distribution in the liquid crystal layer by controlling potential differences among the opposing electrode, the first electrodes, and the second electrodes,
the refractive index distribution having an end portion, a central portion, a first portion, a second portion, a third portion and a fourth portion,
the end portion being located on the center of the one of the two most proximal first electrodes in the second direction,
the central portion being located on the central axis,
the first portion being located between the end portion and the central portion,
the second portion being located between the first portion and the central portion,
the third portion being located between the second portion and the central portion,
the fourth portion being located between the third portion and the central portion,
a refractive index in the refractive index distribution increasing monotonously from the end portion toward the central portion, a first increase rate of the refractive index of the first portion being higher than a second increase rate of the refractive index of the second portion,
the second increase rate being lower than a third increase rate of the refractive index of the third portion,
the third increase rate being higher than a fourth increase rate of the refractive index of the fourth portion.

2. The apparatus according to claim 1, wherein
the first substrate unit further includes a third electrode provided at a position overlaying the central axis on the first major surface to extend in the first direction, and
the drive unit is further electrically connected to the third electrode, and the drive unit is further configured to control a potential difference between the third electrode and the opposing electrode in the forming of the refractive index distribution.

3. The apparatus according to claim 1, wherein,
the first substrate unit further includes a plurality of fourth electrodes provided on the first major surface to extend in the first direction,
one of the fourth electrodes is disposed between the one of the two most proximal first electrodes and the one of the second electrodes disposed between the central axis and the one of the two most proximal first electrodes, one other of the fourth electrodes is disposed between the other of the two most proximal first electrodes and the one other of the second electrodes disposed between the central axis and the other of the two most proximal first electrodes, and
the drive unit is further electrically connected to the fourth electrodes, and the drive unit is further configured to control a potential difference between the opposing electrode and the fourth electrodes in the forming of the refractive index distribution.

4. The apparatus according to claim 1, wherein,
the first substrate unit further includes
an insulating layer provided between the first substrate and the second electrodes, and
a plurality of fourth electrodes provided between the first substrate and the insulating layer to extend in the first direction,
a position of one of the fourth electrodes along the second direction is between a position of the one of the two most proximal first electrodes along the second direction and a position of the central axis along the second direction,
a position of one other of the fourth electrodes along the second direction is between a position of the other of the two most proximal first electrodes along the second direction and the position of the central axis along the second direction,
the one of the second electrodes disposed between the central axis and the one of the two most proximal first electrodes has a first superimposed portion overlaying the one of the fourth electrodes and a first non-superimposed portion not overlaying the one of the fourth electrodes when projected onto a plane parallel to the first direction and the second direction, and
the one of the fourth electrodes has a second superimposed portion overlaying the one of the second electrodes disposed between the central axis and the one of the two most proximal first electrodes and a second non-superimposed portion not overlaying the second electrode disposed between the central axis and the one of the two most proximal first electrodes when projected onto the plane.

5. The apparatus according to claim 4, wherein a distance along the second direction between the central axis and a center position of the one of the fourth electrodes in the second direction is not less than 40% and not more than 80% of a distance along the second direction between the central axis and a center position of the one of the two most proximal first electrodes in the second direction.

6. The apparatus according to claim 1, wherein the first electrodes are arranged in a direction perpendicular to the first direction.

7. The apparatus according to claim 1, wherein the one of the second electrodes has line symmetry with the one other of the second electrodes with the central axis as an axis of symmetry.

8. The apparatus according to claim 1, wherein a distance along the second direction between the central axis and a center position of the one of the second electrodes in the second direction is not less than 40% and not more than 60% of a distance along the second direction between the central axis and a center position of the one of the two most proximal first electrodes in the second direction.

9. The apparatus according to claim 1, wherein a distance between the centers of the two most proximal first electrodes in the second direction is not less than 10 micrometers and not more than 1000 micrometers.

10. The apparatus according to claim 1, wherein the first electrodes, the second electrodes, and the opposing electrode include an oxide including at least one element selected from the group consisting of In, Sn, Zn, and Ti.

11. The apparatus according to claim 1, wherein an absolute value of the potential difference between the opposing electrode and the first electrodes is greater than an absolute value of the potential difference between the opposing electrode and the second electrodes.

12. The apparatus according to claim 11, wherein
the absolute value of the potential difference between the opposing electrode and the first electrodes is not less than 4 volts and not more than 20 volts, and
the absolute value of the potential difference between the opposing electrode and the second electrodes is not less than 1 volt and not more than 10 volts.

13. A drive device configured to drive a liquid crystal optical apparatus,
the liquid crystal optical apparatus including:
a first substrate unit including
a first substrate having a first major surface,
a plurality of first electrodes provided on the first major surface, the first electrodes extending in a first direction and being arranged in a direction non-parallel to the first direction, and
a plurality of second electrodes provided on the first major surface to extend in the first direction, one of the second electrodes being disposed between a central axis and one of the two most proximal first electrodes, one other of the second electrodes being disposed between the central axis and the other of the two most proximal first electrodes, the central axis being parallel to the first direction to pass through a midpoint of a line segment connecting centers of the two most proximal first electrodes in a second direction parallel to the first major surface and perpendicular to the first direction;
a second substrate unit including
a second substrate having a second major surface opposing the first major surface, and an opposing electrode provided on the second major surface to oppose the first electrodes and the second electrodes; and a liquid crystal layer provided between the first substrate unit and the second substrate unit, the drive device being electrically connected to the first electrodes, the second electrodes, and the opposing electrode and configured to form a refractive index distribution in the liquid crystal layer by controlling a potential difference between the opposing electrode and the first electrodes and a potential difference between the opposing electrode and the second electrodes, the refractive index distribution having an end portion, a central portion, a first portion, a second portion, a third portion and a fourth portion, the end portion being located on a position on the second direction of the center of the one of the two most proximal first electrodes in the second direction, the central portion being located on a position on the second direction of the central axis, the first portion being located between the end portion and the central portion, the second portion being located between the first portion and the central portion, the third portion being located between the second portion and the central portion, the fourth portion being located between the third portion and the central portion, a refractive index in the refractive index distribution increasing monotonously from the end portion toward the central portion, a first increase rate of the refractive index of the first portion being higher than a second increase rate of the refractive index of the second portion, the second increase rate being lower than a third increase rate of the refractive index of the third portion, the third increase rate being higher than a fourth increase rate of the refractive index of the fourth portion.

14. The drive device according to claim 13, wherein the first substrate unit further includes a third electrode provided at a position overlaying the central axis on the first major surface to extend in the first direction, and the drive unit is further electrically connected to the third electrode, and the drive unit is further configured to control a potential difference between the third electrode and the opposing electrode in the forming of the refractive index distribution.

15. The drive device according to claim 13, wherein the first substrate unit further includes a plurality of fourth electrodes provided on the first major surface to extend in the first direction, one of the fourth electrodes is disposed between the one of the two most proximal first electrodes and the one of the second electrodes disposed between the central axis and the one of the two most proximal first electrodes, one other of the fourth electrodes is disposed between the other of the two most proximal first electrodes and the one other of the second electrodes disposed between the central axis and the other of the two most proximal first electrodes, and the drive unit is further electrically connected to the fourth electrodes, and the drive unit is further configured to control a potential difference between the opposing electrode and the fourth electrodes in the forming of the refractive index distribution.

16. The drive device according to claim 13, wherein the first substrate unit further includes an insulating layer provided between the first substrate and the second electrodes, and a plurality of fourth electrodes provided between the first substrate and the insulating layer to extend in the first direction;

a position of one of the fourth electrodes along the second direction is between a position of the one of the two most proximal first electrodes along the second direction and a position of the central axis along the second direction, a position of one other of the fourth electrodes along the second direction is between a position of the other of the two most proximal first electrodes along the second direction and the position of the central axis along the second direction, the one of the second electrodes disposed between the central axis and the one of the two most proximal first electrodes has a first superimposed portion overlaying the one of the fourth electrodes and a first non-superimposed portion not overlaying the one of the fourth electrodes when projected onto a plane parallel to the first direction and the second direction, and the one of the fourth electrodes has a second superimposed portion overlaying the one of the second electrodes disposed between the central axis and the one of the two most proximal first electrodes and a second non-superimposed portion not overlaying the second electrode disposed between the central axis and the one of the two most proximal first electrodes when projected onto the plane.

17. An image display device, comprising:

the liquid crystal optical apparatus according to claim 1; and an image display unit stacked with the liquid crystal optical apparatus, the image display unit including a display unit configured to cause light including image information to be incident on the liquid crystal layer.

18. The image display device according to claim 17, wherein the first substrate unit further includes a third electrode provided at a position overlaying the central axis on the first major surface to extend in the first direction, and the drive unit is further electrically connected to the third electrode, and the drive unit is further configured to control a potential difference between the third electrode and the opposing electrode in the forming of the refractive index distribution.

19. The image display device according to claim 17, wherein the first substrate unit further includes a plurality of fourth electrodes provided on the first major surface to extend in the first direction one of the fourth electrodes is disposed between the one of the two most proximal first electrodes and the one of the second electrodes disposed between the central axis and the one of the two most proximal first electrodes, one other of the fourth electrodes is disposed between the other of the two most proximal first electrodes and the one other of the second electrodes disposed between the central axis and the other of the two most proximal first electrodes, and the drive unit is further electrically connected to the fourth electrodes, and the drive unit is further configured to control a potential difference between the opposing electrode and the fourth electrodes in the forming of the refractive index distribution.

20. The image display device according to claim 17, wherein
- the first substrate unit further includes
  - an insulating layer provided between the first substrate and the second electrodes, and
  - a plurality of fourth electrodes provided between the first substrate and the insulating layer to extend in the first direction,
- a position of one of the fourth electrodes along the second direction is between a position of the one of the two most proximal first electrodes along the second direction and a position of the central axis along the second direction,
- a position of one other of the fourth electrodes along the second direction is between a position of the other of the two most proximal first electrodes along the second direction and the position of the central axis along the second direction,
- the one of the second electrodes disposed between the central axis and the one of the two most proximal first electrodes has a first superimposed portion overlaying the one of the fourth electrodes and a first non-superimposed portion not overlaying the one of the fourth electrodes when projected onto a plane parallel to the first direction and the second direction, and
- the one of the fourth electrodes has a second superimposed portion overlaying the one of the second electrodes disposed between the central axis and the one of the two most proximal first electrodes and a second non-superimposed portion not overlaying the second electrode disposed between the central axis and the one of the two most proximal first electrodes when projected onto the plane.

* * * * *